(12) United States Patent
Herbst (10) Patent No.: US 12,330,563 B2
(45) Date of Patent: *Jun. 17, 2025

(54) ADAPTIVE MONITORING OF A VEHICLE USING A CAMERA

(71) Applicant: JUNGO CONNECTIVITY LTD., Netanya (IL)

(72) Inventor: Ophir Herbst, Herzliya (IL)

(73) Assignee: JUNGO CONNECTIVITY LTD., Netanya (IL)

( * ) Notice: Subject to any disclaimer, the term of this patent is extended or adjusted under 35 U.S.C. 154(b) by 35 days.

This patent is subject to a terminal disclaimer.

(21) Appl. No.: 18/377,855

(22) Filed: Oct. 9, 2023

(65) Prior Publication Data

US 2024/0051465 A1 Feb. 15, 2024

Related U.S. Application Data

(63) Continuation-in-part of application No. 17/427,924, filed as application No. PCT/IB2020/050862 on Feb. 4, 2020, now Pat. No. 11,783,600.

(60) Provisional application No. 62/800,574, filed on Feb. 4, 2019.

(51) Int. Cl.
*B60R 1/29* (2022.01)
*G06F 9/50* (2006.01)
*G06V 20/59* (2022.01)

(52) U.S. Cl.
CPC .............. *B60R 1/29* (2022.01); *G06F 9/5055* (2013.01); *G06V 20/59* (2022.01); *B60R 2300/103* (2013.01); *B60R 2300/8006* (2013.01)

(58) Field of Classification Search
None
See application file for complete search history.

(56) References Cited

U.S. PATENT DOCUMENTS 11,783,600 B2 * 10/2023 Herbst ...................... G06T 7/70
340/576

* cited by examiner

*Primary Examiner* — Thomas S McCormack
(74) *Attorney, Agent, or Firm* — AlphaPatent Associates Ltd.; Daniel J. Swirsky (57) ABSTRACT

Monitoring of a full cabin of a vehicle (e.g., including driver and passengers) is provided using a single 2D camera and adaptively applying monitoring algorithms based on different signals, based on a person's state as determined from images of the cabin and/or based on a signal from a non-image sensor. Together with logic to decide which algorithms to run based on available compute resources, embodiments of the invention provide efficient monitoring of the vehicle.

20 Claims, 4 Drawing Sheets

ADAPTIVE MONITORING OF A VEHICLE USING A CAMERA

FIELD

The invention relates to the field of monitoring a scene inside a vehicle.

BACKGROUND

Autonomous vehicles use sensors (visual, acoustic, radar, lidar, sonar, GPS, odometry, etc.) to sense outside dangers whereas manually driven vehicles may have in-cabin sensors, typically to monitor the driver, such as, to warn when the driver is in a distracted state. However, between manually driven vehicles and fully autonomous vehicles, there are a variety of semi-automated vehicles in which the driver and automatic vehicle systems share control of the vehicle. Thus, the interface between a human driver and vehicle systems may require specific consideration. Additionally, distractions which may disrupt and jeopardize occupants of the vehicle, even in a fully automated vehicle, may be related to occupants other than the driver and/or to events not captured by a sensor focused on a specific occupant.

In-cabin sensors today typically focus either on the driver or on the passengers or use a plurality of specialized, costly, sensors to sense multiple areas of the cabin and require integration of the different sensor inputs in order to achieve understanding of the full scene within the vehicle cabin.

SUMMARY

Embodiments of the invention provide monitoring of the full cabin of a vehicle (e.g., including driver and passengers) using a single camera and an efficient method of applying different monitoring algorithms to ensure efficient monitoring of a vehicle, thereby reducing costs (including camera hardware costs) and compute time and memory.

In one embodiment, the invention includes obtaining a sequence of images of an inside of a vehicle, possibly, from a camera configured to include in its field of view all locations of persons in the vehicle. E.g., a single 2D camera positioned at a high front location in the vehicle can detect both passengers' and a driver's faces and hands.

A state of a person in the vehicle is determined based on a set of images (which may include one or a plurality of images) from the sequence of images, and based on the person's state, a monitoring algorithm is chosen from a predetermined list of algorithms, to be applied on a set of subsequently captured images, to monitor the vehicle.

In another embodiment, a method includes receiving a signal from a vehicle related device which is not necessarily an imaging device. A sequence of images of an inside of a vehicle is obtained (possibly, from a camera configured to include in its field of view all locations of persons in the vehicle) and based on the signal from the vehicle related device, a monitoring algorithm chosen from a predetermined list of algorithms, is applied on the sequence of images to obtain monitoring of the vehicle.

Determining vehicle cabin occupancy and attributes of the occupants (such as face features and hand gestures) is important for knowing how many people are in the cabin, their positions, body poses, who they are, their activities, if a child is left in the vehicle, etc. Using a single camera to image the full scene of the cabin enables detecting objects in the vehicle, in addition to detection of people, providing a better understanding of the overall cabin interactions, based on the entire scene context.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide systems and methods for monitoring an inside of a vehicle, including monitoring of people within context of the vehicle space, to determine the situation of or in the vehicle (e.g., if the vehicle is in motion, the level of autonomous control of the vehicle, cabin readiness, a child left in the vehicle, etc.) and to act upon the determined situation.

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Unless specifically stated otherwise, as apparent from the following discussions, it is appreciated that throughout the specification discussions utilizing terms such as "processing," "computing," "calculating," "analyzing" "determining," "detecting", "identifying", "extracting", "obtaining", "applying", "choosing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
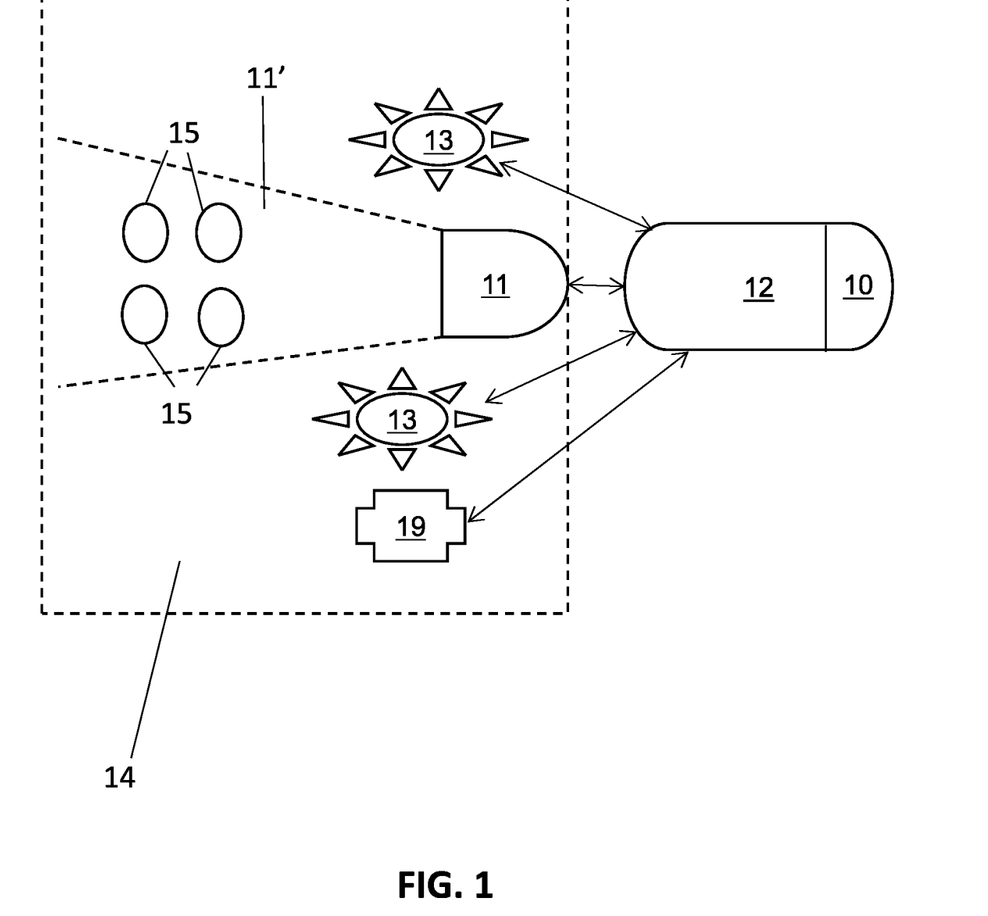
FIG. 1 schematically illustrates a system for monitoring the inside of a vehicle, according to embodiments of the invention.

FIG. 1 schematically illustrates a system operable according to embodiments of the invention. The system includes a camera 11 to capture images of an inside of a vehicle 14. The camera 11, which may be a 2D camera including a near infrared (IR) sensor, is designed to include in its field of view (FOV) 11' all locations of people 15 in the vehicle 14.

Vehicle 14 may be any type of vessel for transporting people and/or cargo, such as a car, truck, bus, train, boat, airplane, etc.

Camera 11 typically includes a CCD or CMOS or other appropriate image sensor. The camera 11 may be a 2D camera, which may be, for example, part of a standard camera provided with mobile devices such as smart phones or tablets. In some embodiments, camera 11 includes an image sensor capable of capturing IR or near IR light, to enable detection in images even in low visibility conditions (such as at night). In other embodiments camera 11 includes a sensor capable of capturing a plurality of illumination wavelengths, e.g., a sensor capable of capturing both IR and visible light (such as a sensor using OmniVision™'s RGB-IR technology). In some embodiments, camera 11 may include a bandpass filter that enables visible light to pass, optionally together with a bandpass around near IR light (e.g. 850 nm or 940 nm or within this range).

The camera 11 may include multiple different lens types. For example, camera 11 may include a wide-angle lens (e.g., fisheye lens) to provide a wide FOV. In some embodiments, optics of camera 11 (e.g., lenses, mirrors, filters, etc.) may be designed per vehicle type. For example, a small vehicle, such as a car, may use a simple off the shelf 2D camera whereas a larger vehicle such as a truck or bus, may use a wide-angle lens and/or additional optics such as mirrors, to provide full coverage of the inside of the vehicle.

Camera 11 may be positioned at a vantage point in the vehicle 14, e.g., on the ceiling of the vehicle 14, in an overhead console or on the driver's mirror, so as to enable capturing all locations of persons in the vehicle, e.g., all passenger and driver seats.

Other sensing devices and methods may be employed in addition to camera 11, such as laser-based sensors, radar detectors, time of flight cameras etc. These additional devices may be positioned at different positions within the vehicle 14 and their input may supplement the information obtained from images captured by camera 11.

The system may include one or more illumination source(s) 13, such as a white light source and/or an IR or near IR illumination source (e.g., illuminating at 850 nm or 940 nm or within this range).

The system further includes a processor 12 and one or more memory unit(s) 10. Processor 12 may include, for example, one or more processors and may be a central processing unit (CPU), a digital signal processor (DSP), a Graphical Processing Unit (GPU), a microprocessor, a controller, a chip, a microchip, an integrated circuit (IC), or any other suitable multi-purpose or specific processor or controller.

In some embodiments processor 12 is a dedicated unit. In other embodiments processor 12 may be part of an already existing processor, such as a vehicle processor. For example, the processor 12 may be one core of a multi-core CPU already existing in a vehicle, such as in the vehicle IVI (In-Vehicle Infotainment) system, telematics box of the vehicle, domain controller or another processor associated with the vehicle.

Processor 12 may be locally embedded or remote, e.g., cloud-based.

Memory unit(s) 10 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments, image data from camera 11 may be stored in memory unit 10. An algorithms database 16, that maintains a list of monitoring algorithms, may be maintained at memory unit 10 or at another device. In some embodiments the list of monitoring algorithms is prioritized, as further described below. Typically, memory unit 10 stores executable instructions that, when executed by the processor 12, facilitate performance of operations of the processor 12, as described herein.

In one embodiment, processor 12 can determine a person's state from at least one image captured by camera 11. Processor 12 can also access database 16, and may choose from the list of monitoring algorithms, a monitoring algorithm to apply on additional images captured by camera 11, based on the person's state.

A person's state refers to physiological and/or psychological circumstances of a person. The circumstances may be related or unrelated to operation of the vehicle. A person's state may be detected by processor 12 based on tracking the person or body parts of the person (e.g., head or hands) throughout a sequence of images. For example, gesture recognition algorithms, for example, hand gesture recognition algorithms, may be used to determine a state of a person. Additionally, biometric parameters that can be detected from images of a person, may be indicative of a person's state. Biometric parameters may include, inter alia, head rotation, mouth area size, mouth shape, location of head, head movements and pose of the person, as well as eye related parameters, such as, one or more eye pupil direction, pupil diameter, blink frequency, blink length and percentage of eyelid closed (perclos).

The state of the person may be determined, in some embodiments, by running computer vision algorithms (e.g., face detection and/or eye detection algorithms) including machine learning and deep learning processes, e.g., to extract biometrics of the person. A human's head or face may be tracked in a sequence of images of the person and biometric parameters of the person can be extracted based on the tracking. In one embodiment biometric parameter values of a specific human obtained from a first set of images are used to represent the baseline or normal state of the human and may thus be used as a reference frame for biometric parameter values of that same human obtained from a second, later captured, set of images.

A "monitoring algorithm" refers to a specific sequence of automatically performed steps that are designed to detect and/or track and/or identify people and objects within the space of a vehicle. Monitoring algorithms, according to embodiments of the invention, typically include using computer vision techniques, e.g., optical flow methods, histogram of gradients, deep neural networks or other appropriate detection and tracking methods. Object and/or person detection algorithms (e.g., YOLO object detection, OpenPose person detection, Open CV face detection) may be used as well as tracking algorithms (e.g., object tracking using Open CV). Eye gaze information may be calculated, e.g., by training deep learning methods with tagged images of eyes. Other computer vision techniques may be used such as color detection and shape detection algorithms.

Database 16 may maintain a lookup table or other index matching persons' states with monitoring algorithms.

Table I and its explanation below demonstrates illustrative examples of possible indexing. Other states and algorithms may be used according to embodiments of the invention.

TABLE I

| | Person | Person's state | Monitoring algorithm |
|---|---|---|---|
| 1 | driver | Approaching fatigue | Eye tracking |
| 2 | driver | Trying to merge into traffic | No hand gesture recognition |
| 3 | passenger | Waving hand | Face detection |

In row 1 of the table above, a state of a person, determined to be the driver of the vehicle, may be determined by processor 12, as "approaching fatigue" (e.g., based on yawns or head nodding detected from images of the driver). This state may require monitoring the person's eyes to enable quick recognition of a hazardous situation in which the driver is falling asleep (as demonstrated, for example, by a high percent perclos) and may invoke a monitoring algorithm which includes eye tracking of the person.

In row 2 of the table above, a state of a person determined to be a driver, is determined by processor 12 as "trying to merge into traffic" (e.g., based on repetitive side to side head motion). It is highly probably that in this state the driver will not be using hand gestures to operate the vehicle and/or a vehicle related device such as a smartphone. Thus, processor 12 will not apply hand gesture recognition algorithms (or stop running hand gesture recognition algorithms) while this state of the driver is detected.

In row 3 of the table above, a person determined to be a passenger, is determined to be waving his hand (e.g., based on motion detection algorithms and tracking of the hand in images of the vehicle). This state may require closer monitoring of the passenger(s), e.g., to detect the passenger's age, gender, emotions, etc. This may invoke a monitoring algorithm which includes face detection and algorithms for determining age (e.g., within a range of ages) and/or gender and/or emotion of a person (e.g., based on the detected face of the person).

Classification of a person (e.g., determining if the person is a driver or a passenger) may be based on, for example, the location of the person in the space of the vehicle. E.g., a driver in a vehicle will typically be located at the front of the vehicle, or directly in front of the steering wheel, while the passengers will be located in other places in the cabin. Alternatively, or in addition, the person can be classified based on appearance. E.g., a driver may be wearing a uniform and can thus be detected based on the different colors of his uniform and/or shape of his cap, etc.

Classifying people as described above is greatly assisted by the use of a single camera producing an image which includes the full cabin of the vehicle and which enables understanding the relative locations of people and objects within the vehicle space.

Processor 12 applies monitoring algorithms differentially and adaptively based on different signals; based on a person's state as determined from images (as described above) and/or based on a signal from a non-image sensor (as described further below), possibly together with logic to decide which algorithms to run based on available compute resources.

Thus, in some embodiments a method for monitoring a vehicle includes using a processor or multiple processors of a monitoring system, to determine a current state of a person in a vehicle based on a first set of images of the inside of the vehicle and determining, based on the current state of the person and based on available compute resources of the system, which monitoring algorithm (typically, from a predetermined list of algorithms), to apply on a second set of images of the inside of the vehicle, to obtain monitoring of the vehicle. The second set of images includes images subsequent to the first set of images.

Monitoring algorithms in the predetermined list of algorithms may be each assigned a priority. For example, safety related monitoring algorithms may be assigned a higher priority than convenience related monitoring algorithms, and/or may be assigned to processors with higher availability or faster processing or dedicated processing power or more suitable processing capabilities. Such processors may include, for example, artificial intelligence (AI), deep learning, accelerators, graphics processing unit (GPU)s, tensor processing unit (TPU)s, field programmable gate arrays (FPGAs) or other types of processors. Safety related monitoring algorithms may be initiated or applied in cases where the person's state indicates a possible unsafe event; e.g., a distracted or drowsy driver, and may include using computer vision techniques such as eye detection and/or tracking, face or other body part detection and/or tracking, and the like. Convenience related monitoring algorithms are typically applied to increase convenience of a person. For example, determining if a person wishes to operate a device (such as the car radio or phone) using gestures, determining if a person is smoking, determining how a person is dressed, etc., can all result in applying monitoring algorithms meant to provide a convenient environment in the vehicle (e.g., by controlling the vehicle air conditioning or infotainment system). Such monitoring algorithms may include, for example, using gesture recognition techniques.

The availability of compute resources such as, central processing unit (CPU), GPU, accelerators, FPGAs, computer memory, input/output (I/O) devices, network connections, and other components and processors listed herein, may be measured, for example, in percent usage. If, for example, usage of a compute resource is above a predetermined threshold (or available compute resources are below the predetermined threshold), then only high priority monitoring algorithms (e.g., safety related) may be used, whereas, if usage of a compute resource is below the threshold (or the available compute resources are above the predetermined threshold), then also low priority monitoring algorithms (e.g., convenience related) may be used.

In some embodiments, monitoring algorithms are applied using specific compute resources to obtain guaranteed response times. For example, a high priority monitoring algorithm, e.g., a safety related monitoring algorithm, which typically requires real-time results, may be applied using a compute resource having a currently low percent usage, or a compute resource having a high enough performance to ensure providing real-time responses.

Systems according to embodiments of the invention may include one or more processors, may have different architectures and may use different types of storage. In some embodiments, different monitoring algorithms are applied to different processor units based on the available compute resource or performance of each different processor unit.

Prioritizing monitoring algorithms and applying different monitoring algorithms to different processor units and/or compute resources, possibly based on the prioritization, allows optimizing overall resource usage, memory usage, response times and other such parameters of a monitoring system. This enables to prioritize algorithms and optimize the system to provide efficient monitoring of the vehicle, priority processing to algorithms that need real time response or known response times, and efficient use of compute resources.

Monitoring algorithms may include steps prior to or after applying computer vision algorithms, such as steps to change illumination or focus of the camera, e.g., to assist the computer vision algorithms.

In some embodiments, processor 12 controls the illumination source(s) 13 based on the person's state, as determined from images captured by camera 11. For example, a state of a person, may require monitoring the person's eyes (e.g., as described above). However, if the person is wearing sunglasses, the person's eyes may not be visible in white light (e.g., ambient light). Processor 12 can detect a face of a person with sunglasses in an image, for example, by training deep learning networks with enough samples of positive and negative glasses and sunglasses. Once sunglasses are detected an "approaching fatigue and wearing sunglasses" state of the person can be determined (for example). Processor 12 may then operate one or more illumination device 13 to illuminate near IR light to enable eye tracking in this situation. In one embodiment the processor can turn on/off the near IR illumination, based on the detection of the sunglasses. Thus, near IR illumination may be turned on when sunglasses are detected in the image and turned off when sunglasses are not detected in the image.

Eye tracking from a camera positioned at a high front location in the vehicle may be difficult using corneal reflections (which is a known method for eye tracking). Therefore, embodiments of the invention use appearance-based detection algorithms to track eyes, e.g., by training deep learning methods with tagged images of eyes.

In another embodiment processor 12 controls operation of the camera 11 based on the person's state. For example, processor 12 can determine from images of the inside of vehicle 14 that a passenger is in a state of "waving a hand". As described above, this state may require monitoring the passengers faces, which may require changing focus of the camera, e.g., to zoom in on passengers' faces and/or adjusting sensitivity of the camera 11 to obtain better images of the passengers' mouths, eyes, or other features of the face. In this case, processor 12 may control the zoom and/or sensitivity of camera 11 as appropriate.

In another embodiment, additional devices, such as laser-based sensors, radar detectors, time of flight cameras etc., may be controlled based on the person's state. In some embodiments, controlling an additional device (e.g., as listed herein) is part of a chosen monitoring algorithm.

Once a monitoring algorithm is chosen and applied to images of the inside of vehicle 14, monitoring of the vehicle is achieved and a situation within the cabin of the vehicle may be revealed based on the input from the monitoring algorithm. In some embodiments, processor 12 controls a device based on the monitoring of the inside of the vehicle. For example, processor 12 can control operation of the vehicle 14 (e.g., by communicating with the CAN (Controller Area Network) bus of the vehicle) and/or may control an alert device and/or may control the camera 11 or additional sensor, based on the situation revealed from the monitoring of the vehicle. For example, camera 11 may be operating at a low frame capture rate, e.g., capturing 2 frames per second, however, when monitoring of the vehicle reveals a hazardous situation such as distraction, stress or drowsiness of a driver, the camera 11 may be controlled to change the frame capture rate, e.g., to increase the rate to 30 frames per second, and to send the images, upon detection of the hazardous situation, to a remote device. Thus, live streams of images of the driver and/or passengers in a hazardous situation may be sent to one or more remote devices that are accessible to remote users such as call centers, employers, friends or family, who can monitor the cabin substantially in real-time and call the driver and/or issue alarms and/or call for help if necessary.

In some embodiments, processor 12 may receive a signal (or several signals) from one or more vehicle related device(s) 19, such as a device operated via the infotainment system of the vehicle 14 (such as a smartphone and/or radio connected via the infotainment system), or a non-image sensor such as a GPS device connected to the vehicle, an accelerometer connected to the vehicle, a speedometer connected to the vehicle, a turn angle sensor of the vehicle, a vehicle door open/close sensor, and the like. Processor 12 may then, based on the signal or combination of signals, apply a monitoring algorithm chosen from database 16, on a sequence of images of an inside of a vehicle obtained from camera 11, to achieve monitoring of the vehicle 14.

Database 16 may maintain a lookup table or other index matching signals from vehicle related devices with monitoring algorithms.

Table II and its explanation below demonstrates illustrative examples of possible indexing. Other states and algorithms may be used according to embodiments of the invention.

TABLE II

| | Person | Signal from device | Monitoring algorithm |
|---|---|---|---|
| 1 | driver | Call in from phone | Gesture recognition |
| 2 | passenger | Ignition off | Person detection |
| 3 | passenger | 1. Vehicle not moving<br>2. Vehicle door opened and then closed | Object/person detection |
| 4 | passenger | Geographical location signal from vehicle navigation system | Person counting |

In row 1 of the table above, a signal of a call coming in on a phone connected via the vehicle's infotainment system may mean that the driver will want to take the call using hand gestures, so as not to have to take his eyes off the road to operate his phone. This may invoke a monitoring algorithm which includes gesture recognition (e.g., hand detection (e.g., based on shape and/or color of the hand) and tracking movement of the detected hand and possibly tracking of individual fingers to detect gestures which include the hand and/or fingers of the person).

In row 2 of the table above, a signal from the vehicle's ignition on/off sensor indicating that the ignition is turned off, may invoke a "detect if child was left in vehicle" algorithm, which includes people detecting.

In row 3 of the table above, two signals together may indicate that the driver and/or passenger have left the vehicle; the first signal from a motion sensor (or geographical location sensor) connected with the vehicle, shows that the vehicle is not moving and the second signal from the vehicle's doors open/close sensor indicates that a door has been opened and then closed. In this case, a "left object" algorithm may be invoked, which includes using object detection algorithms and/or a "detect if child was left in vehicle" algorithm may be invoked, which includes people detecting.

In row 4 of the table above a signal from a GPS or other vehicle navigation or geographical location system, may indicate a specific geographical location, e.g., the entrance to a toll road. Processor 12 may then apply a person counting algorithm on images of the vehicle to determine, for example, if there are enough passengers in the vehicle to be toll-exempt. Processor 12 may then send the number of passengers in the vehicle to a control tower of the toll road.

Thus, methods and systems according to embodiments of the invention, may assist in compliance with regulations (e.g., requiring left child alert or requiring a minimal number of people in a vehicle for toll exempt), using a low-cost solution, according to embodiments of the invention.

In some embodiments, processor 12 chooses a monitoring algorithm based on a person's state, as determined from images of the inside of the vehicle and based on a signal received from a vehicle related device, which may be a non-image sensor, e.g., accelerometer or speedometer and/or from a geographical location sensor. Thus, for example, a monitoring algorithm may be chosen based on a state of the driver only if an accelerometer indicates that the vehicle is moving, or a speedometer indicates the vehicle is moving in a predetermined speed range. Other combinations of a person's state and a signal from a non-image sensor or other vehicle related device, may be used to choose a monitoring algorithm.

Communication between components of the system and/or external components (such vehicle related devices 19 and/or control towers or remote monitoring centers) may be through wired or wireless connections. For example, system components may include a communication link socket and/or a wireless adapter.

Figure 2:
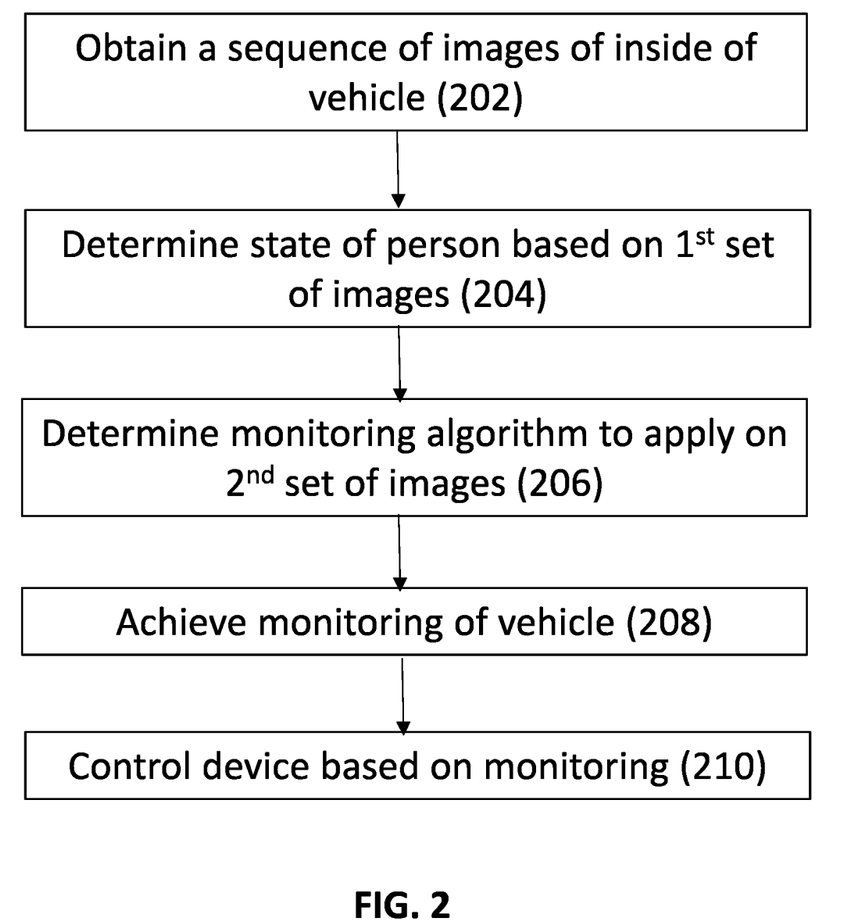
FIG. 2 schematically illustrates a method for monitoring the inside of a vehicle, based on images, according to embodiments of the invention.

FIG. 2 schematically illustrates a method carried out by processor 12, according to an embodiment of the invention. Processor 12 obtains a sequence of images of an inside of a vehicle (202), typically from a single camera, and determines a state of a person in the vehicle based on a first set of (one or more) images from the sequence of images (204). Processor 12 then determines, based on the person's state, which monitoring algorithm from a predetermined list of algorithms, to apply on a second set of images (which were captured subsequent to the first set of images) (206). Once the chosen monitoring algorithm is applied on the second set of images, monitoring of the vehicle is achieved (208). A device may be controlled based on the monitoring of the vehicle (210).

For example, operation of vehicle related systems (such as radio, breaks, accelerator, autonomous driving systems, etc.) may be controlled based on the monitoring of the vehicle. For instance, autonomous driving systems may be controlled to take control if the monitoring of the vehicle indicates the driver is drowsy or otherwise distracted.

Determining whether a driver (or other person) is drowsy or distracted may be done by using one or a combination of detection algorithms. For example, drowsiness can be determined by detecting a person's face and then tracking a person's eye blinks and/or mouth (e.g., to detect yawning) and possibly tracking movement of the person's head (e.g., to detect head nodding). In another example, face, eyes and hands may be detected and tracked to determine if a person is distracted. For example, high frequency eye and hand movements may indicate attention of the driver is not fully on the road. In another example, object detection may be applied to determine distraction. For example, an object (such as a phone, an article of food, a cup or bottle, etc.) detected in the driver's hand together with eye gaze direction at the object may indicate the driver is focused on the phone or food or drink and not on the road.

In another example, an alert device may be controlled based on the monitoring of the vehicle. For instance, an alarm in the vehicle (or at a remote site) may be sounded or a light or other visual indication may be turned on if the monitoring of the vehicle indicates the driver is drowsy or otherwise distracted.

In yet another example, operation of the camera that is capturing the sequence of images, can be controlled based on the monitoring of the vehicle. For instance, the frame capture rate of the camera may be changed if a hazardous event is detected based on the monitoring, in order to obtain a video of the event for sending to a remote monitoring center and/or for retention purposes.

In some embodiments, a monitoring algorithm includes identifying one or more of a person's body parts in the second set of images, to determine location of the body parts. In other embodiments, the monitoring algorithm includes tracking of a person's body parts in the second set of images, to determine motion of the body parts.

In some embodiments, a state of a person can be determined based on location of body parts of the person and/or based on movement of body parts of the person in the first set of images.

Figure 3:
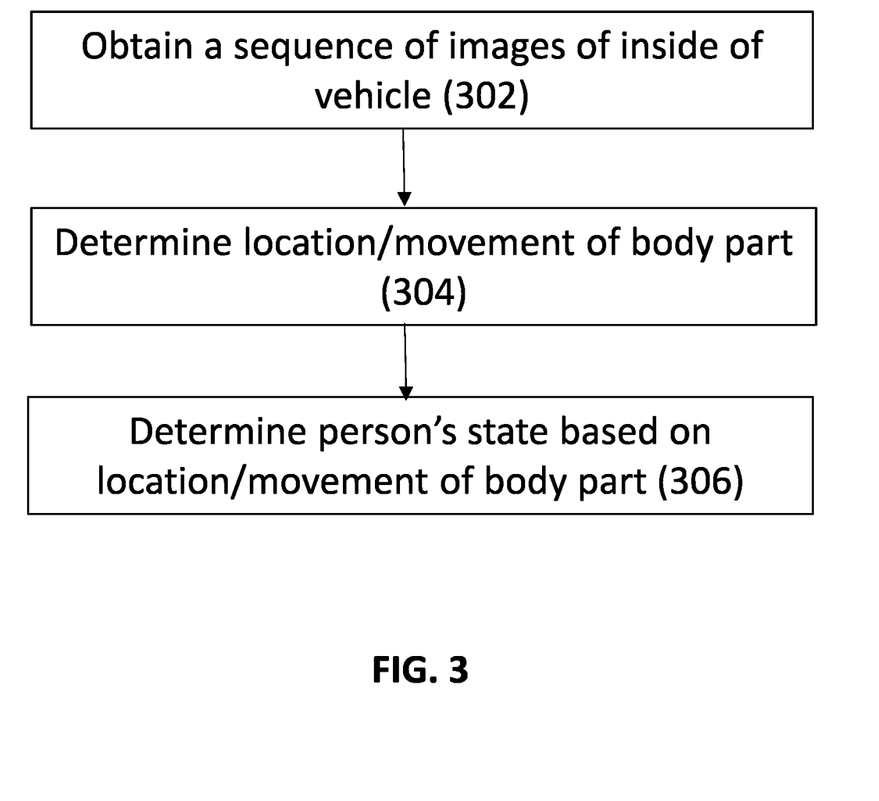
FIG. 3 schematically illustrates a method for determining a state of a person from images of the inside of the vehicle, according to embodiments of the invention.

FIG. 3 schematically illustrates methods for determining a state of a person, according to embodiments of the invention. Processor 12 obtains a sequence of images of an inside of a vehicle (302), and determines a location of a body part (e.g., a hand) of a person in the vehicle from the sequence of images (304). Processor 12 then determines, based on the location, a state of the person (306).

For example, location of a person's hand may be determined to be on a steering wheel (e.g., the steering wheel may be detected by using object detection algorithms), in which case the state of the person may be determined to be "driving" or not on the steering wheel, in which case the state of the person may be determined to be "hands occupied, distracted". In one embodiment, location of a person's hands may be determined by detecting the person's face and then searching for the person's hands at a predetermined location relative to the face. Other methods for detecting a person's hands in an image may be used.

Similarly, processor 12 may determine movement of a body parts, such as hands or a head from the images and may determine the person's state based on the detected movement. For example, repetitive side to side movement of a person's head may indicate a state of "trying to merge into traffic", as described above. In another example, if a person's hand is not located on the steering wheel and his hand is determined to be repetitively moving to the person's face, the person's state may be determined to be "smoking".

In some embodiments, since the sequence of images is obtained by a single camera and each image includes all persons in the vehicle, a state of a person may be determined based on information regarding another person in the vehicle. A single image which includes the whole environment of the vehicle provides context, which may be instrumental in determining the state of a person. For example, a driver may be detected as turning his face sideways. If the driver is turning his face to a window or mirror of the vehicle his state may be determined to be "driving", invoking a first type of monitoring algorithm. However, if the driver is turning his face to another person in the vehicle (e.g., to a passenger), his state may be determined to be "distracted", invoking a second type of monitoring algorithm.

In another example, a specialized, narrow FOV camera, such as a time of flight camera, can detect a driver's gesture, but cannot tell if the driver is gesturing at the vehicle's infotainment system, to control it, or waving at a passenger next to him. A single image which includes the whole environment of the vehicle, captured according to embodiments of the invention, enables determining the intension of the driver's gesturing and the driver's state (and corresponding monitoring algorithm) may be determined more accurately.

Use of a single camera enables using a single processor, rather than several processors used by several sensors, thereby reducing costs and enabling mass market deployment of systems according to embodiments of the invention.

Additionally, using a single image of the full cabin environment may provide confirmation for additional, non-image-based systems in the vehicle (e.g., seat belt detectors).

Furthermore, embodiments of the invention may reduce the need for the additional sensors (e.g., seat weight sensor, seat belt sensor, etc.).

The methods for determining a state of a person, as described above, applied on a first set of images, may similarly be used by monitoring algorithms applied on a second, subsequent, set of images, to monitor people in the vehicle.

Figure 4:
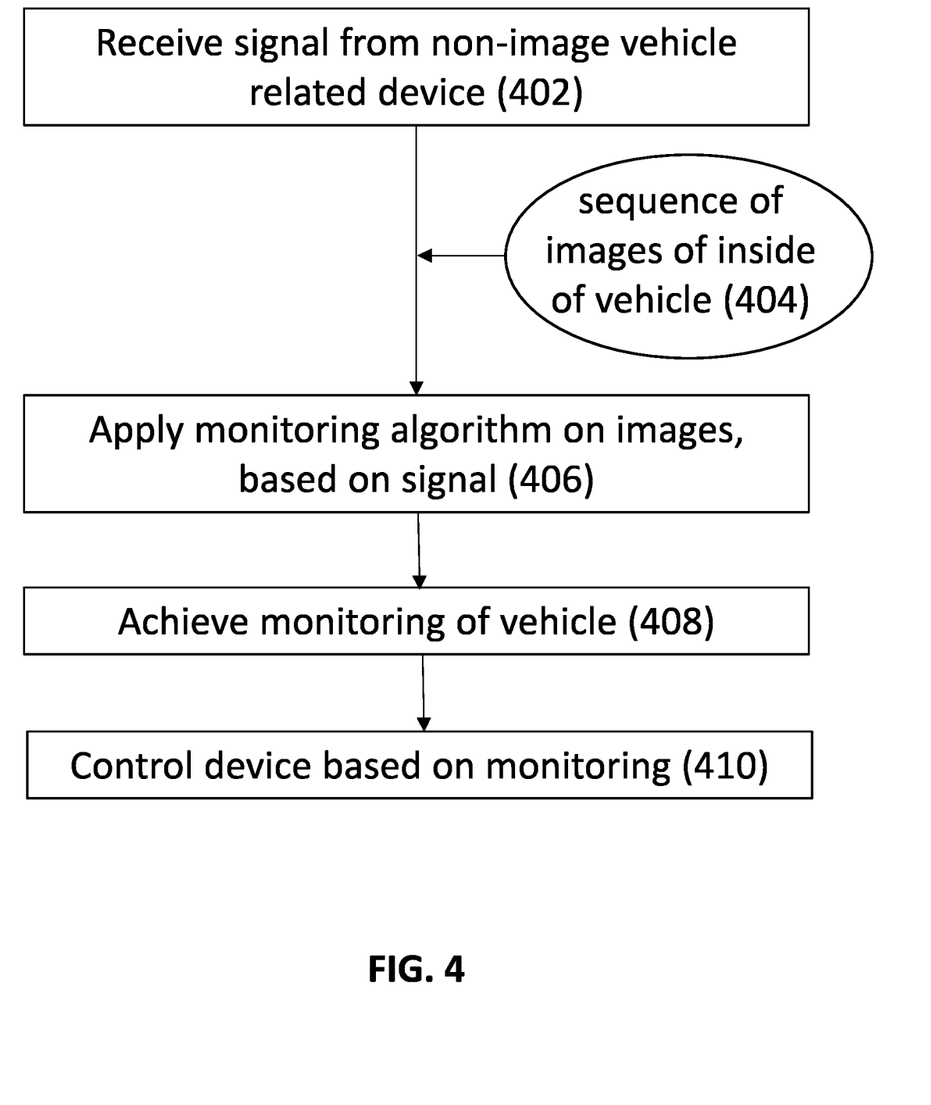
FIG. 4 schematically illustrates a method for monitoring the inside of a vehicle, based on a signal from a non-image sensor, according to embodiments of the invention.

FIG. 4 schematically illustrates a method carried out by processor 12, according to another embodiment. Processor 12 receives a signal from a vehicle related device (402), such as a phone connected via the vehicle's infotainment system or a vehicle related sensor or geographical sensor, as described above. Processor 12 also obtains a sequence of images of an inside of the vehicle (404). The processor applies a monitoring algorithm, chosen from a predetermined list of algorithms, on the sequence of images, based on the signal (406) and possibly based on a person's state that can be determined from the sequence of images. Once the chosen monitoring algorithm is applied on the sequence of images, monitoring of the vehicle is achieved (408). A device may be controlled based on the monitoring of the vehicle (410), e.g., as described above.

In one example, a signal from a motion detector and/or geographical location sensor connected with the vehicle indicates that the vehicle is not in motion. In this case a people counting algorithm may be applied on the sequence of images. If the signal indicates that the vehicle is in motion (e.g., above a predetermined velocity) then a driver monitoring algorithm may be applied on the sequence of images (e.g., face detection, eye tracking and hand gesture recognition to detect driver distraction and/or face detection and eye tracking to detect driver drowsiness).

In another example, a signal from a vehicle related system (e.g., the vehicle's doors open/close sensor and/or the vehicle's ignition on/off sensor) may invoke a monitoring algorithm that includes applying a people detection and/or counting algorithm on images of the inside of the vehicle, to determine, for example, if and how many people entered the vehicle, and applying a person identification algorithm, e.g., on the person located at the driver's seat, to identify the driver (passengers may be similarly identified).

Identity of a person may be determined by using age and gender detection algorithms and/or by comparing age/gender/face features, etc. with data in database maintaining identities of specific people.

In some embodiments, a state of a person, determined to be a driver of a vehicle (e.g., based on the person's location in the driver's seat), may be determined to be "using a phone" (e.g., based on object detection (for detecting a phone) and hand movement detection algorithms applied on images of the inside of the vehicle). If the situation of the vehicle is determined to be "fully autonomous" (e.g., based on input from the vehicle computer) then the state of "using a phone" may invoke applying a hand gesture recognition algorithm to monitor the driver and enable gesture and/or voice control of the phone by the driver. However, if the vehicle is determined to be "manually controlled" or "semi-autonomous" then a state of "using the phone" is considered to be a distracted state of the driver and, possibly in addition to applying hand gesture recognition, an eye tracking algorithm may be applied to monitor the driver's gaze, to enable alerting when a hazardous situation is determined (based on the eye tracking).

In another example, a state of a person, determined to be a driver of a vehicle, may be determined to be "drowsy" (e.g., based head movements, as described above). If the situation of the vehicle is determined to be "moving at a speed below a threshold" (e.g., based on input from a motion detector and/or geographical location sensor connected with the vehicle) then driver monitoring algorithms (e.g., as described above) will be applied. However, if the situation of the vehicle is determined to be "moving speed above threshold", then driver monitoring algorithms may be applied together with an increase in camera frame capture rate and/or a change in illumination.

Using a single camera and/or adaptively applying monitoring algorithms, as in the examples above, enables optimized and efficient monitoring of the vehicle.

What is claimed is:

1. A method comprising:
using a processor or multiple processors of a monitoring system to determine a current state of a person in a vehicle based on a first set of images of an inside of the vehicle;
determining, based on the current state of the person and based on available compute resources of the system, which monitoring algorithm from a predetermined list of algorithms, to apply on a second set of images of the inside of the vehicle, the second set comprising images subsequent to the first set of images, to obtain monitoring of the vehicle; and
controlling a device based on the monitoring of the vehicle.

2. The method of claim 1 wherein the monitoring algorithms in the predetermined list of algorithms are assigned a priority.

3. The method of claim 2 comprising applying a monitoring algorithm assigned a high priority, when the available compute resources are below a predetermined threshold and applying both a monitoring algorithm assigned a high priority and a monitoring algorithm assigned a low priority, when the available compute resources are above the predetermined threshold.

4. The method of claim 2 comprising applying a monitoring algorithm using a specific compute resource to obtain a guaranteed response time.

5. The method of claim 2 comprising applying a different monitoring algorithm to different processor units based on the available compute resource of each different processor unit.

6. The method of claim 2 wherein safety related monitoring algorithms are assigned a high priority and wherein convenience related monitoring algorithms are assigned a low priority.

7. The method of claim 1 wherein the first and second sets of images are captured by a single camera.

8. The method of claim 1, further comprising:
receiving a signal from a non-image vehicle related device; and
determining which monitoring algorithm to apply based on the signal and based on the current state of the person and based on the available compute resources.

9. The method of claim 1 comprising controlling operation of a vehicle related system based on the monitoring of the vehicle.

10. The method of claim 1 comprising controlling an alert device based on the monitoring of the vehicle.

11. The method of claim 1 comprising controlling operation of a camera capturing the sets of images, based on the monitoring of the vehicle.

12. A system for monitoring an inside of a vehicle, the system comprising:
a camera to capture images of an inside of the vehicle, the camera configured to include in its field of view all locations of persons in the vehicle;
an algorithm's database that maintains a list of prioritized monitoring algorithms; and
a processor or multiple processors configured to
determine a current state of a person from at least one image of the inside of the vehicle, and
choose, from the list of prioritized monitoring algorithms, a monitoring algorithm to apply on additional images of the inside of the vehicle, based on the current state of the person and based on available compute resources of the system.

13. The system of claim 12 comprising a near IR illumination source and wherein the camera comprises a sensor configured to collect near IR light.

14. The system of claim 12 wherein the processor controls an illumination source based on the chosen monitoring algorithm.

15. The system of claim 12 wherein the processor controls the camera based on the chosen monitoring algorithm.

16. The system of claim 12 wherein the processor controls operation of vehicle related systems based on monitoring of the inside of the vehicle.

17. The system of claim 12 wherein the processor controls an alert device based on monitoring of the inside of the vehicle.

18. The system of claim 12 wherein the processor applies a monitoring algorithm assigned a high priority, when the available compute resources are below a predetermined threshold and applies both a monitoring algorithm assigned a high priority and a monitoring algorithm assigned a low priority, when the available compute resources are above the predetermined threshold.

19. The system of claim 12 wherein safety related monitoring algorithms are assigned a high priority and wherein convenience related monitoring algorithms are assigned a low priority.

20. The system of claim 12 wherein the processor or multiple processors applies a monitoring algorithm using a specific compute resource to obtain a guaranteed response time.

* * * * *